(12) United States Patent
Dageville et al.

(10) Patent No.: US 10,977,245 B2
(45) Date of Patent: *Apr. 13, 2021

(54) BATCH DATA INGESTION

(71) Applicant: Snowflake Inc., San Mateo, CA (US)

(72) Inventors: Benoit Dageville, San Mateo, CA (US); Varun Ganesh, San Mateo, CA (US); Jiansheng Huang, San Mateo, CA (US); Jiaxing Liang, Bellevue, WA (US); Haowei Yu, Newark, CA (US); Scott Ziegler, San Mateo, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,421

(22) Filed: Jul. 29, 2020

(65) Prior Publication Data
US 2020/0356551 A1 Nov. 12, 2020

Related U.S. Application Data

(63) Continuation of application No. 16/720,418, filed on Dec. 19, 2019, which is a continuation of application No. 16/201,854, filed on Nov. 27, 2018.
(Continued)

(51) Int. Cl.
*G06F 17/00* (2019.01)
*G06F 16/23* (2019.01)
(Continued)

(52) U.S. Cl.
CPC ...... *G06F 16/2386* (2019.01); *G06F 16/2255* (2019.01); *G06F 16/2282* (2019.01); *G06F 16/254* (2019.01)

(58) Field of Classification Search
CPC combination set(s) only.
See application file for complete search history.

(56) References Cited

U.S. PATENT DOCUMENTS 8,291,192 B2 * 10/2012 Ueno ............... G06F 12/023
711/173
9,477,551 B1 * 10/2016 Piszczek ............ G06F 3/0617
(Continued)

FOREIGN PATENT DOCUMENTS

CN 111480154 A 7/2020
WO WO-2019104338 A1 5/2019

OTHER PUBLICATIONS

"U.S. Appl. No. 16/201,854, Non Final Office Action dated Jun. 29, 2020", 70 pgs.
(Continued)

*Primary Examiner* — Hung D Le
(74) *Attorney, Agent, or Firm* — Schwegman Lundberg & Woessner, P.A.

(57) ABSTRACT

The subject technology obtains, at a database system, an ingest request to ingest one or more files into a table of a database. The subject technology, after obtaining the ingest request and prior to the ingesting of the one or more files, persists the one or more files in a file queue that corresponds to the table. The subject technology assigns the one or more files to one or more execution nodes to be ingested into the table. The subject technology operates an ingest puller to poll the file queue. The subject technology ingests, by the one or more execution nodes, the one or more files into one or more micro-partitions of the table via one or more pipes.

30 Claims, 9 Drawing Sheets

Related U.S. Application Data

(60) Provisional application No. 62/591,118, filed on Nov. 27, 2017.

(51) Int. Cl.
  *G06F 16/22*  (2019.01)
  *G06F 16/25*  (2019.01)

(56) References Cited

U.S. PATENT DOCUMENTS

| | | |
|---|---|---|
| 10,262,264 B2 | 4/2019 | Sanchez et al. |
| 10,268,688 B2 | 4/2019 | Dubbels et al. |
| 10,346,744 B2 | 7/2019 | Dodson |
| 2003/0005024 A1 | 1/2003 | Grumann |
| 2005/0004862 A1 | 1/2005 | Kirkland et al. |
| 2007/0011135 A1* | 1/2007 | Chitgupakar ............ G06F 16/20 |
| 2008/0052713 A1* | 2/2008 | Flemming ............. G06F 9/5061 718/102 |
| 2008/0077927 A1 | 3/2008 | Armstrong et al. |
| 2010/0070753 A1 | 3/2010 | Kido et al. |
| 2010/0115226 A1 | 5/2010 | Ueno |
| 2010/0122175 A1* | 5/2010 | Gupta ................. H04L 41/0893 715/735 |
| 2011/0016160 A1* | 1/2011 | Zhang ..................... G06F 16/24 707/805 |
| 2011/0276396 A1* | 11/2011 | Rathod ................. H04L 51/066 705/14.49 |
| 2012/0089562 A1 | 4/2012 | Deremigio et al. |
| 2012/0179809 A1* | 7/2012 | Barsness ........... G06F 16/24568 709/224 |
| 2012/0207075 A1 | 8/2012 | Nagaraj et al. |
| 2013/0024424 A1* | 1/2013 | Prahlad ................... G06F 16/41 707/640 |
| 2013/0124467 A1 | 5/2013 | Naidu et al. |
| 2014/0337510 A1 | 11/2014 | Gesmann |
| 2015/0006069 A1 | 1/2015 | Kwon et al. |
| 2015/0026114 A1 | 1/2015 | Triff |
| 2015/0134626 A1* | 5/2015 | Theimer ................. G06F 16/21 707/693 |
| 2015/0134795 A1 | 5/2015 | Theimer et al. |
| 2015/0294048 A1 | 10/2015 | Jones |
| 2015/0310030 A1* | 10/2015 | Balmin ................... G06F 16/27 707/704 |
| 2015/0356426 A1 | 12/2015 | Sanchez et al. |
| 2016/0050261 A1 | 2/2016 | Mcdaid et al. |
| 2017/0024248 A1 | 1/2017 | Roth et al. |
| 2017/0147229 A1 | 5/2017 | Kingdon et al. |
| 2017/0235785 A1 | 8/2017 | Feltham et al. |
| 2017/0331709 A1 | 11/2017 | Lam et al. |
| 2018/0089328 A1 | 3/2018 | Bath et al. |
| 2018/0150500 A1 | 5/2018 | Le et al. |
| 2018/0203744 A1 | 7/2018 | Wiesmaier et al. |
| 2019/0073373 A1 | 3/2019 | Surale et al. |
| 2019/0163754 A1 | 5/2019 | Huang et al. |
| 2019/0220459 A1 | 7/2019 | Huang et al. |
| 2020/0125558 A1 | 4/2020 | Dageville et al. |
| 2020/0356552 A1 | 11/2020 | Dageville et al. |

OTHER PUBLICATIONS

"U.S. Appl. No. 16/201,854, Preliminary Amendment Filed Jan. 3, 2020", 16 pgs.

"U.S. Appl. No. 16/365,219, Preliminary Amendment Filed Jan 3, 2020", 12 pgs.

"U.S. Appl. No. 16/720,418, Non Final Office Action dated Feb. 19, 2020".

"U.S. Appl. No. 16/720,418, Notice of Allowance dated Jun 19, 2020", 9 pgs.

"U.S. Appl. No. 16/720,418, Response Filed May 19, 2020 to Non Final Office Action dated Feb. 19, 2020", 9 pgs.

"International Application Serial No. PCT/US2018/062652, International Preliminary Report on Patentability dated Jun. 11, 2020", 16 pgs.

"International Application Serial No. PCT/US2018/062652, International Search Report dated Feb. 8, 2019", 2 pgs.

"International Application Serial No. PCT/US2018/062652, Written Opinion dated Feb. 8, 2019", 14 pgs.

"U.S. Appl. No. 16/201,854, Examiner Interview Summary dated Sep. 30, 2020", 4 pgs.

"U.S. Appl. No. 16/201,854, Response filed Sep. 29, 2020 to Non Final Office Action dated Jun 29, 2020", 15 pgs.

"U.S. Appl. No. 16/720,418, Notice of Allowability dated Nov. 9, 2020", 6 pgs.

"U.S. Appl. No. 16/720,418, Notice of Allowance dated Sep. 1, 2020", 8 pgs.

"U.S. Appl. No. 16/943,251, Non Final Office Action dated Sep. 3, 2020", 6 pgs.

"U.S. Appl. No. 16/943,251, Response filed Dec. 3, 2020 to Non Final Office Action dated Sep. 3, 2020", 10 pgs.

"Korean Application Serial No. 10-2020-7017339, Voluntary Amendment filed Jul. 14, 2020", with machine translation, 10 pgs.

\* cited by examiner

BATCH DATA INGESTION

CROSS-REFERENCE TO RELATED APPLICATIONS

This application is a continuation of U.S. patent application Ser. No. 16/720,418, filed on Dec. 19, 2019, entitled "BATCH DATA INGESTION IN DATABASE SYSTEMS", which is a continuation of U.S. patent application Ser. No. 16/201,854, filed Nov. 27, 2018, entitled "BATCH DATA INGESTION IN DATABASE SYSTEMS", which claims priority to U.S. Provisional Patent Application Ser. No. 62/591,118 filed Nov. 27, 2017, entitled "SYSTEMS, METHODS, AND DEVICES FOR BATCH DATA INGESTION," and the contents of each are incorporated herein by reference in their entireties for all purposes.

TECHNICAL FIELD

The present disclosure relates to databases and more particularly relates to incremental ingestion of data in a database or table.

BACKGROUND

Databases are widely used for data storage and access in computing applications. Databases may include one or more tables that include or reference data that can be read, modified, or deleted using queries. Databases can store anywhere from small to extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

Data may be ingested from a data bucket into one or more tables of a database. A variety of systems have been developed, described, and are widely known for uploading and storing data in a database or table. For example, in a shared-disk system, all data is stored on a shared storage device that is accessible from all processing nodes in a data cluster. In this type of system, all data changes are written to the shared storage device to ensure that all processing nodes in the data cluster access a consistent version of the data. As the number of processing nodes increases in a shared-disk system, the shared storage device (and the communication links between the processing nodes and the shared storage device) becomes a bottleneck slowing data read and data write operation. This bottleneck is further aggravated with the addition of more processing nodes. Thus, existing shared-disk systems have limited scalability due to this bottleneck problem.

Another existing data storage and retrieval system is referred to as a "shared-nothing architecture." In this architecture, data is distributed across multiple processing nodes such that each node stores a subset of the data in the entire database. When a new processing node is added or removed, the shared-nothing architecture must rearrange data across the multiple processing nodes. This rearrangement of data can be time-consuming and disruptive to data read and write operations executed during the data rearrangement. And, the affinity of data to a particular node can create "hot spots" on the data cluster for popular data. Further, since each processing node performs also the storage function, this architecture requires at least one processing node to store data. Thus, the shared-nothing architecture fails to store data if all processing nodes are removed. Additionally, management of data in a shared-nothing architecture is complex due to the distribution of data across many different processing nodes.

Existing systems and methods for data ingestion use a single command with a one/nothing statement that may cause files to be lost. For example, in existing systems, a file ingestion may fail partway through ingestion of a table and cause all previously ingested data to be lost. Further in conventional data ingest, a user may be required to allocate a warehouse and issue commands, and data updates may not be captured until the user has issued a specific command.

The systems and methods described herein provide an improved approach to data storage, data ingesting, and data retrieval that alleviates the above-identified limitations of existing systems.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Figure 1:
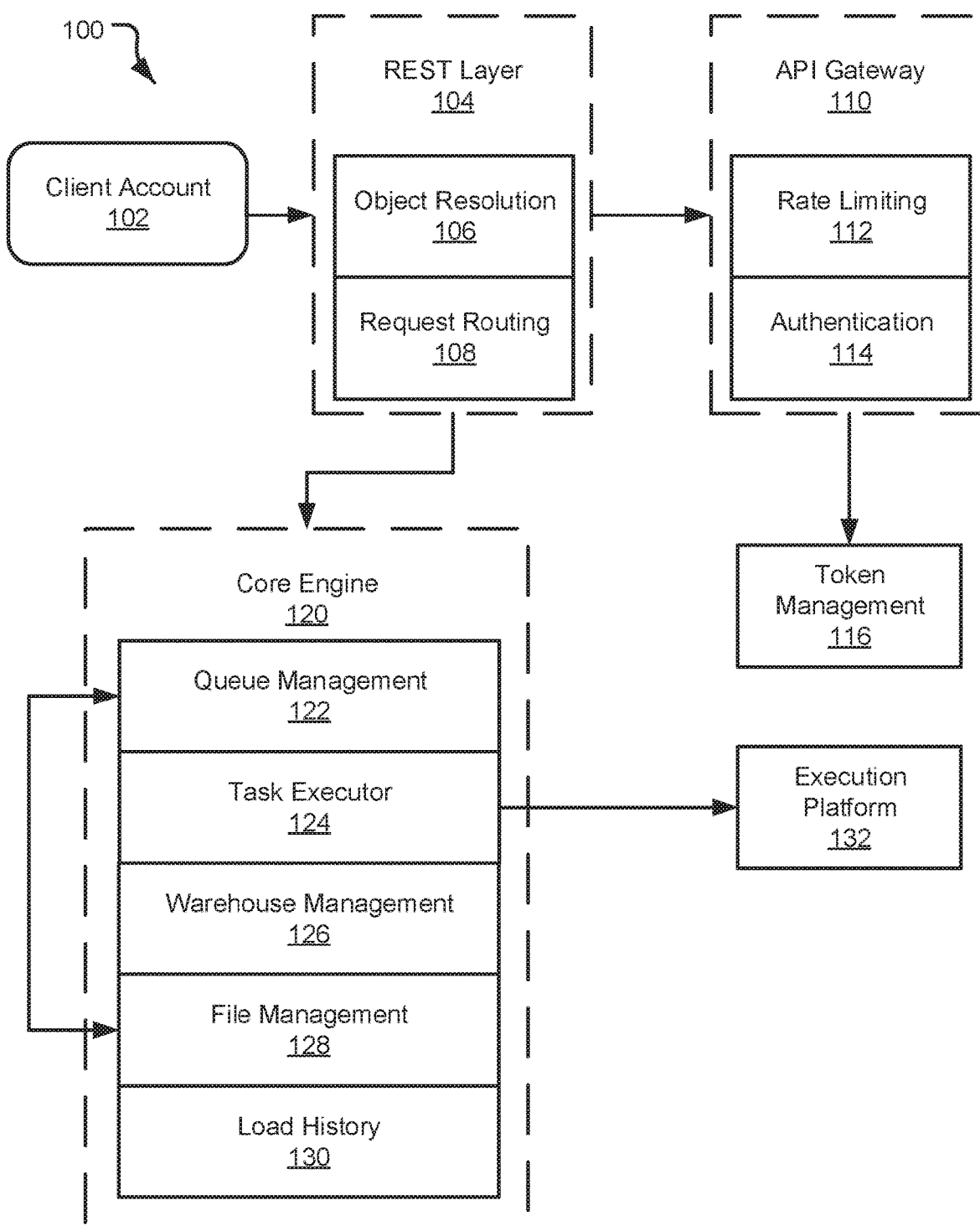
FIG. 1 is a block diagram architecture model of a system for automated data ingestion in accordance with the teachings and principles of the disclosure.

Systems, methods, and devices for batch data ingestion to a database or table are disclosed. In traditional database systems known in the art, user files may be inserted into a database table by way of a copy command. This necessitates the use of a running warehouse that is allocated to data ingestion and it is executed as a synchronous operation. Further in this traditional approach, the use of a database table for querying or other operations may be blocked when new data is inserted into the table during the data ingestion operation. Further, any updates made to the table or any new data received from a client account will not be captured by the database until a user again n reissues a copy command to insert the new user file. When data is ingested by way of a single command, such as a copy command that is manually initiated by a user, some or all of the data may be lost if an ingestion task fails. In such traditional systems known in the art, a data ingestion operation may fail partway through and therefore necessitate that the entire data ingestion operation be repeated.

Improved systems, methods, and devices for data ingestion into a database are disclosed herein. Such improved systems, methods, and devices lower the burdens on database systems that arise due to frequent data loading and simplify the processes for data ingestion for a user of a client account. In the systems, methods, and devices disclosed herein, data from user files is incrementally committed to micro-partitions of a database table such that the data already ingested is not lost even in the event of a system failure. The data may be partitioned and inserted into the database partition-by-partition such that, in the event of a system failure, the ingestion operation may continue from the point when the failure occurred.

Additionally, processing resources for the systems, methods, and devices disclosed herein may be scaled up or down as needed. As such, a warehouse is not required in the systems as disclosed herein, in contrast with the traditional database ingestion systems known in the art. The systems, methods, and devices disclosed herein provide for asynchronous and serverless data ingestion of user files. Changes made to a client data bucket, such as one or more new user files being added to the client data bucket, are detected and such new files are automatically loaded into an appropriate database table without requiring a specific command from a user of the client account. Further, the target table for data of one or more user files is automatically determined, and such user files are assigned to an appropriate instance of a resource manager that is assigned to manage the ingestion of new data into particular tables of the database.

The systems, methods, and devices disclosed herein further include generating and maintaining metadata concerning what data and what user files have been successfully committed to the database. The metadata further indicates, for example, in which micro-partition and in which table the data was inserted, whether the data was successfully inserted, when the data was inserted, the size of the data that was inserted, and so forth. Such metadata may be shared across an execution platform and across a plurality of shared storage devices collectively storing database. The metadata may be stored separately from the plurality of shared storage devices or it may be stored within the plurality of shared storage devices. Further the metadata may be stored as a separate micro-partition within a database table or may be stored within a micro-partition that comprises database data.

In an embodiment of the disclosure, a system for incremental ingest of data into a database is disclosed. The system includes means for determining a notification indicating a presence of a user file received from a client account to be ingested into a database. The system includes means for identifying data in the user file and means for identifying a target table of the database to receive the data in the user file. The system includes means for generating an ingest task indicating the data and the target table. The system includes means for assigning the ingest task to an execution node of an execution platform, wherein the execution platform comprises a plurality of execution nodes operating independent of a plurality of shared storage devices collectively storing database data. The system includes means for registering metadata concerning the target table in a metadata store after the data has been fully committed to the target table by the execution node.

In an embodiment of the disclosure, a method for batch data ingestion into a database is disclosed. The method includes determining a notification indicating a presence of a user file received from a client account to be ingested into a database. The method includes identifying data in the user file and identifying a target table of the database to receive the data in the user file. The method includes generating an ingest task indicating the data and the target table. The method includes assigning the ingest task to an execution node of an execution platform, wherein the execution platform comprises a plurality of execution nodes operating independent of a plurality of shared storage devices collectively storing database data. The method includes registering metadata concerning the target table in a metadata store after the data has been fully committed to the target table by the execution node. In an embodiment, the method is performed by a resource manager (see e.g. 302) of a database system.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for triggering tasks to be executed on database data in response to a modification made to the data.

Change tracking information can be stored as metadata in a database. This metadata describes the data that is stored in database tables of customers but is not actually the stored table data. Metadata can get very large, especially if there are large database tables of many customers. Current database systems have severe limitations handling large amounts of metadata. Current database systems store metadata in mutable storage devices and services, including main memory, file systems, and key-value stores. These devices and services allow the metadata to be updated data in-place. If a data record changes, it may be updated with the new information and the old information is overwritten. This allows databases to easily maintain mutable metadata by updating metadata in-place.

However, these mutable storage devices and services have limitations. The limitations are at least two-fold. First, mutable storage devices such as main memory and file systems have a hard limit in terms of storage capacity. If the size of the metadata exceeds these limits, it is impossible to store more metadata there. Second, mutable storage services such as key-value stores perform poorly when reading large volumes of metadata. Reading data is performed using range scans, which take a long time to finish. In practice, range scans can take many minutes or even approach an hour to complete in large scale deployments.

These limitations make it impossible to store large amounts of metadata in existing mutable storage devices and services. Systems, methods, and devices disclosed herein provide for improved metadata storage and management that includes storing metadata in immutable (non-mutable) storage such as micro-partitions. As used herein, immutable non-mutable storage includes storage where data cannot or is not permitted to be overwritten or updated in-place. For example, changes to data that is located in a cell or region of storage media may be stored as a new file in a different, time-stamped, cell or region of the storage media. Mutable storage may include storage where data is permitted to be overwritten or updated in-place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data files may only be added or deleted, but never updated. In one embodiment, storing and maintaining metadata on these services requires that, for every change in metadata, a metadata file is added to the storage service. These metadata files may be periodically consolidated into larger "compacted" or consolidated metadata files in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 1000 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

In an embodiment, file metadata is stored within metadata storage. The file metadata contains table versions and information about each table data file. The metadata storage may include mutable storage (storage that can be over written or written in-place), such as a local file system, system, memory, or the like. In one embodiment, the micro-partition metadata consists of two data sets: table versions and file information. The table versions data set includes a mapping of table versions to lists of added files and removed files. File information consists of information about each micro-partition, including micro-partition path, micro-partition size, micro-partition key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

In one embodiment, metadata, including a change tracking column, may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

Databases may include a plurality of tables that may each further include immutable storage devices such as micro-partitions. User files may be incrementally ingested into a database table in the form of immutable micro-partitions such that data in the user file is not lost. Data from one or more user files may be ingested in incremental portions of data that must be fully and successfully committed to a database table before the user file is deemed to have been ingested into the database.

A client account to a database system may provide one or more user files containing data. The user file may be committed to a client account queue and data may be identified in the user file. The user file may be assigned to an execution node of an execution platform such that the execution platform may generate a micro-partition or other immutable storage device to be inserted into the target table of the database that includes the data in the user file.

For example, this new system may operate without a customer or third-party warehouse or server and may simplify data transfer for a client account. In an embodiment, data ingestion is completed incrementally where files are committed to the database in batches such that a system failure does not cause the data to be lost. In an embodiment, the system detects changes to files and automatically loads the changes into the database without requiring a specific command from a user. In an embodiment, the system ingests batches of data and tracks the process during data pulling and data commitment such that the system may continue data ingestion at the same place if a failure occurs during data ingestion.

An embodiment of the present disclosure provides a system for data ingestion having increased elasticity over existing systems. In an embodiment, the system includes a plurality of computing resources and virtual warehouses, and data is autonomously ingested incrementally using available resources. Computing capacity is dynamically adapted by altering the use of computing resources and varying the workload on the system. In an embodiment, a pool of common resources is provided for a plurality of client accounts and the use of computing cores is completely dynamic and flexible across all client accounts.

An embodiment of the present disclosure provides a system for data ingestion having increased granularity over existing systems. In an embodiment, the system inputs and commits data incrementally and protects data ingestion against potential network failure. In an embodiment, one user file or a fraction of a user file is ingested at one time. In an embodiment, once a threshold number of user files has been received, the user files will automatically be committed to a database table. The user files may be committed to the database table in the form of immutable micro-partitions that cannot be altered in-place. In an embodiment, the status of database data, such as the contents of a database table, is stored in metadata such that the system may recover precisely what user file has been ingested and at which position.

In the following description of the disclosure, reference is made to the accompanying drawings, which form a part hereof, and in which is shown by way of illustration specific implementations in which the disclosure may be practices. It is understood that other implementation may be utilized, and structural changes may be made without departing from the scope of the disclosure.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

Reference throughout this specification to "one embodiment," "an embodiment," "one implementation," "an implementation," "one example," or "an example" means that a particular feature, structure, or characteristic described in connection with the embodiment, implementation, or example is included in at least one embodiment of the present disclosure. Thus, appearances of the above-identified phrases in various places throughout this specification are not necessarily all referring to the same embodiment, implementation, or example. In addition, it should be appreciated that the figures provided herewith are for explanation purposes to persons ordinarily skilled in the art.

As used herein, the terms "comprising," "including," "containing," and grammatical equivalents thereof are inclusive or open-ended terms that do not exclude additional, unrecited elements or method steps.

As used herein, "table" is defined as a collection of records (rows). Each record contains a collection of values of table attributes (columns). Tables are typically physically stored in multiple smaller (varying size or fixed size) storage units, e.g. files or blocks.

Embodiments in accordance with the present disclosure may be embodied as an apparatus, method or computer program product. Accordingly, the present disclosure may take the form of an entirely hardware-comprised embodiment, an entirely software-comprised embodiment (including firmware, resident software, micro-code, etc.) or an embodiment combining software and hardware aspects that may all generally be referred to herein as a "circuit," "module" or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using a new data processing platform. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database, and any type of data storage and retrieval platform, using any data storage architecture and using any language to store and retrieve data within the data storage and retrieval platform. The systems and methods described herein further provide a multi-tenant system that supports isolation of computing resources and data between different customers/clients and between different users within the same customer/client.

In an embodiment of the disclosure, systems, methods, and devices for a batch data ingestion service are described. The batch data ingestion service may reduce the burden on a data storage vendor caused by frequent data loading. The service may further make it more convenient for a data storage client to load data with the data storage vendor.

In an embodiment of the disclosure, a batch data ingestion service is a Representational State Transfer (REST) service with language-specific wrapping Application Program Interfaces (APIs). An embodiment of the service is asynchronous such that the loading of data into files occurs at a later time after files are submitted for loading. An embodiment of the service is durable such that file names are committed to persistent storage before the REST call returns. An embodiment of the service provides clients with the ability to insert data without writing a SQL command and avoids a multi-step process of posting and copying data into the database.

Referring now to the figures, FIG. 1 is a schematic block diagram of a system 100 for batch data ingestion and for storing database data in one or more tables by way of a data pipeline system. FIG. 1 is not a representation of the flow of data or control. The system 100 includes a client account 102 that may be in communication with a database system. Such client account 102 may provide new data or update data to be committed to a database. The system 100 includes REST (Representational State Transfer) layer 104 that includes object resolution 106 and request routing 108 systems. The system 100 includes an API (Application Program Interface) gateway 110 that includes rate limiting 112 and authentication 114 systems. The system 100 includes token management 116 protocol. The system includes a core engine 120 in communication with the REST layer 104. The core engine 120 includes systems or protocols responsible for queue management 122, task execution 124, warehouse management 126, file management 128, and load history 130. The core engine 120 is in communication with an execution platform 132 that is configured to execute one or more tasks, such as data ingestion tasks.

The client account 102 is in communication, either directly or indirectly, with a resource manager (see e.g. 204 302) of a database system. The REST layer 104 may be a component of the resource manager 302. The client account 102 provides user files to be ingested into a database. The user files may be uploaded to a vendor service, such as Amazon Web Services™ or other suitable cloud computing service. The resource manager 302 may receive a notification that a user file has been added to the client account that should be ingested into the database, or that some data within the database should be updated. In various implementations, the resource manager 302 may receive such notification automatically or it may periodically poll a data bucket associated with the client account 102 to determine whether any user files have been added.

The REST layer 104 includes a thin outer layer capable of handling payload translation into internal format and is further capable of handling simple validation. In an embodiment, the REST layer 104 exists inside a resource manager (see e.g. 204, 302). The REST layer 104 includes object resolution 106 responsible for transitioning from a scoped table name to a table identification (may be referred to herein as TableID). The REST layer 104 further includes request routing 108 responsible for routing a request to the proper instance of a resource manager 302 for a destination table of a user file received from the client account 102. In an embodiment, request routing 108 occurs after object resolution 106. Request routing 108 may use consistent hashing with virtual nodes to manage which GS instance owns which table.

In an embodiment, when a vendor account (such as a third-party account responsible for receiving user files) receives one or more names of user files, the object resolution 106 protocol resolves those names of the user files to internal names. The internal names for the user files are cached.

In an embodiment, the request routing 108 protocol of the REST layer 104 of the resource manager 302 is configured to receive user files from the client account 102 and route those user files to one or more execution nodes of an execution platform for ingesting and processing. In an embodiment, the vendor account (that is, a third-party account responsible for receiving user files directly or indirectly from a client account 102 and providing those user files to, for example, the resource manager 302) may use consistent hashing with virtual nodes to manage which resource manager 302 owns a particular database table. The vendor account may hash on a table identification and an identification for a particular resource manager 302 to find a match between a user file and a resource manager 302. The hash space is divided into equally sized partitions. Given a number of resource manager 302 instances, each resource manager 302 takes a number of partitions. When the resource manager 302 adds an execution node to an execution platform (such as the core engine 120), the resource manager 302 will pull random partitions from each execution node to preserve the ratio of partition rations. Similarly, when an execution node fails, the ration of partitions are spread out among remaining execution nodes. This mapping may be maintained by a vendor account.

In an embodiment, a database record including all virtual node mappings is transactionally modified every time a virtual node assignment is changed. A value associated with the virtual node will be stored in memory with an object that is processing requests for a given table of the database. The value may be passed back and forth with every interaction between the resource manager 302 and an execution platform 132. The value may be used to detect stale state or requests which may be discarded.

In an embodiment, a tableList slice is used during recovery situations to communicate with the vendor account. The tableList slice may indicate what database tables are managed by a given virtual node. The tableList slice may be added to or amended as needed and may be cleaned up on a best effort basis when the vendor account notice for a table has been deleted or is no longer active.

In an embodiment, the entire virtual node table may be cached in memory on each resource manager 302. Each resource manager 302 may watch for changes to a database table and poll the database table periodically as a backup measure. In an embodiment, when a request to ingest new user files must be routed by the request routing 108 protocol, the vendor account may hash the tableId and determine the virtual node containing the hash, and then the vendor account may lookup the virtual node in the table and route to a particular resource manager 302.

The API gateway 110 includes a thin layer to guard access to the core engine 120. The API gateway 110 includes rate limiting 112 responsible for basic limits to prevent a large influx of data ingestion requests. The API gateway 110 includes authentication 114 responsible for validating the API token passed in a REST request.

In an embodiment, the authentication 114 protocol comprises a set of down-scoped credentials. The down-scoped credentials may be used to create an API token scoped to a particular table. The token may have the TableID baked into it and may be created programmatically. The token may have a short lifetime (in an embodiment the token may expire in 30 minutes, one hour, two hours, three hours, and so forth). In an embodiment a client account 102 may dictate the expiration of the token and/or receive a new token programmatically. In an embodiment, the system 100 receives the token, validates the token, and validates whether the TableID specified in the token matches the name of the table specified in the REST request. In an implementation where the TableID and the table specified in the REST request do not match, the caller will receive a particular error response that will request a new token. In an embodiment, the system 100 requires a new token to every time a table is modified.

Token management 116 is responsible for generating new tokens and revoking prior tokens on demand. The core engine 120 is a core logic that manages the processing of incoming data. The core engine 120 includes queue management 122 responsible for managing queues of incoming files, including adding or removing files from the queue. The task executor 124 begins and manages the execution platform jobs for loading files, including interactions with a compiler. The warehouse management 126 manages a loading warehouse, including scaling up and down on demand. The file management 128 is responsible for handling the ingest version of registering native binary files and capturing errors. The load history 130 tracks the history of the loads and errors for a given table. The load history 130 may further purge load history after a period or after a maximum number of entries has been reached.

In an embodiment, the task executor 124 knows the current total number of active tasks and the desired number of active tasks. The task executor 124 communicates the desired number of active tasks to a resource manager 302 that will strive to keep the size of the warehouse at the desired number of active tasks. The resource manager 302 may accomplish that by smoothing the demand over time by way of a moving average over some time period that is a fraction of the desired latency. The resource manager 302 may further accomplish that by keeping the size of the warehouse slightly larger than the actual need to accommodate temporary spikes. The resource manager 302 may further accomplish that by carefully releasing execution nodes and/or assigning work to one or more execution nodes in such a way as to compact the usage to permit reasonable freeing of execution nodes when needed.

In an embodiment, the task executor 124 generates the execution plan of the ingest task. The execution plan may be similar to the plan of copy command. The task executor 124 may create a code change in copy option including an internal Boolean option "ingest_mode" to current copy command. The execution plan may compile from the SQL text "copy into T ingest_mode=true" to disable certain functions. The task executor 124 may further include a code change in scansset, including a Boolean property "dynamic_scanset" that may be true if the copy is in ingest mode.

In an embodiment, warehouse management 126 manages the warehouse for data ingestion. The warehouse management 126 may control scaling up and down based on demand, assign work to execution nodes, track states of tasks on the warehouse to allow correct assignments, and track failed servers and respond accordingly. In an embodiment, the warehouse management 126 is incorporated in a resource manager 302. It should be noted that because the ingest task is single threaded, there will be assigned one task per core on one warehouse node. For each warehouse node, the number of running tasks is tracked. The task executor 124 may schedule a new task, ask the warehouse management 126 for a server to use, and the warehouse management 126 will choose already busy servers to make it easier to free execution nodes when the load decreases. The task executor 124 must inform warehouse management 128 about task completion.

In an embodiment, load history 130 monitors the loading result and keeps track of whether files or data have successfully been ingested into the database. The ingest history may further be stored in a metadata store within the database or separate from the database and accessible by a resource manager 302. The ingest history includes, for example, the file name, TableID, file size, row count, status, and first error. In an embodiment, the error management of the data loading will be a separated project.

Figure 2:
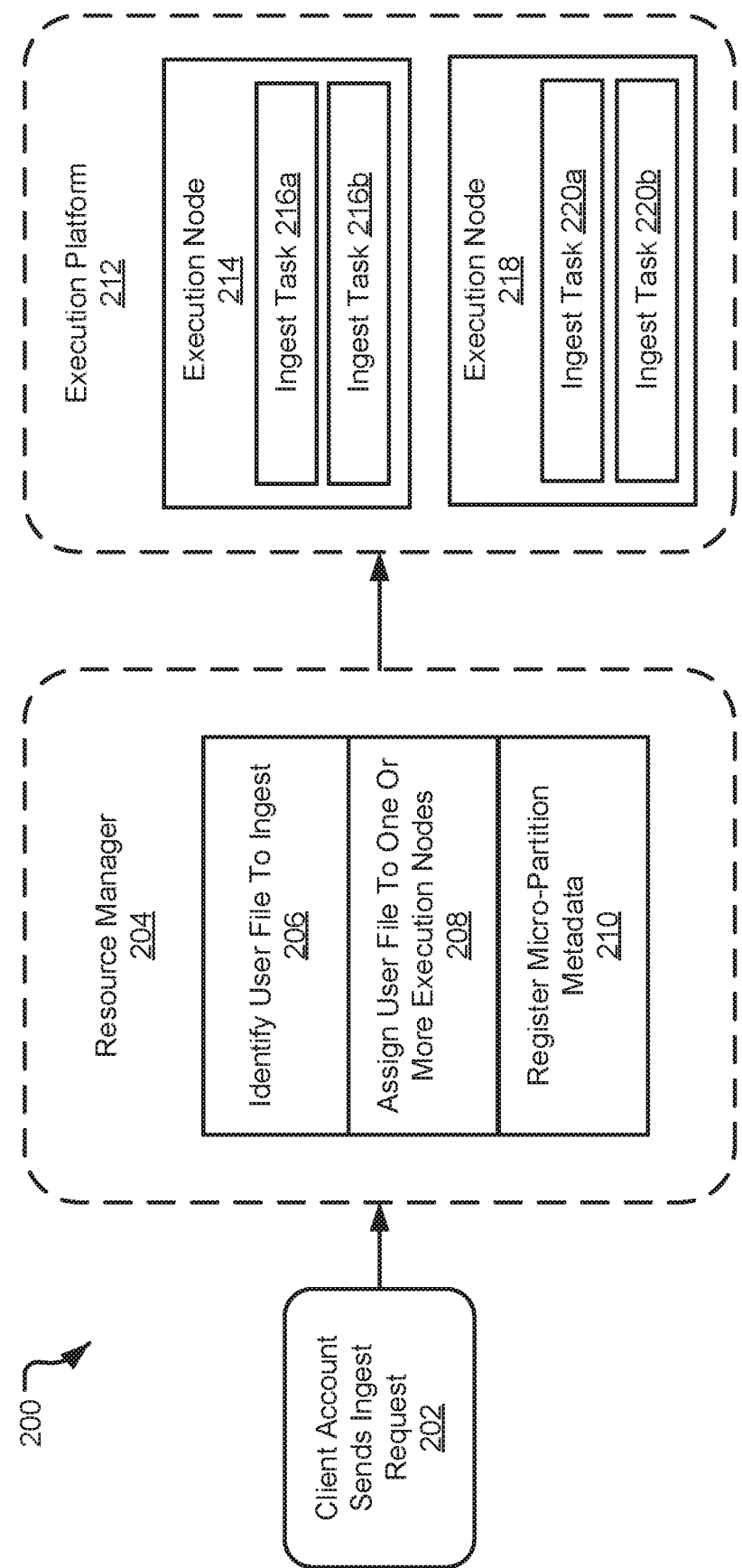
FIG. 2 is a block diagram of a process of ingesting data in accordance with the teachings and principles of the disclosure.

FIG. 2 is a schematic block diagram of a process 200 of ingesting data into a database. The process 200 begins and a client account 102 sends an ingest request at 202. The client account 102 may directly or indirectly communicate with the database system to send in the ingest request. In an embodiment, the ingest request is a notification provided by a third-party vendor storage account, or the ingest request may arise from a resource manager 302 polling a data lake associated with the client account 102 to determine whether any user files have been added to the client account 102 that have not yet been ingested into the database. The notification includes a list of user files to insert into a table of the database. The user files are persisted in a queue specific to the receiving table of the database.

The ingest request is received by a resource manager 204 (see also 302). The resource manager 204 identifies at 206 a user file to ingest, assigns at 208 the user file to one or more execution nodes, and registers at 210 micro-partition metadata associated with a database table after the user file is ingested into a micro-partition of the database table. The resource manager 204 provisions one or more execution nodes 214, 218 of an execution platform 212 to perform one or more tasks associated with ingesting the user file. Such ingest tasks 216a, 216b, 220a, 220b include, for example, cutting a user file into one or more partitions, generating a new micro-partition based on the user file, and/or inserting the new micro-partition in a table of the database.

The system 200 begins an IngestTask that will run on a warehouse. The IngestTask will pull user files from the queue for a database table until it is told to stop doing so. The IngestTask will periodically cut a new user file and add it to the database table. In one embodiment, the ingest process is "serverless" in that it is an integrated service provided by the database or resource manager 204. That is, a user associated with the client account 102 need not provision its own warehouse or a third-party warehouse in order to perform the ingestion process. For example, the database or database provided (e.g., via instances of the resource manager 204) may maintain the ingest warehouse that then services one or more or all accounts/customers of the database provider.

It should be appreciated that there may be more than one IngestTask pulling from a queue for a given table, and this might be necessary to keep up with the rate of incoming data. In an embodiment, the IngestTask may decide the time to cut a new file to increase the chances of getting an ideal sized file and avoid "odd sized" files that would result if the file size was line up with one or more user files. This may come at the cost of added complexity as the track line number of the files consumed must be tracked.

In an embodiment, all requests for a particular table will be routed to a single instance of the resource manager 204. Each instance of the resource manager 204 may be responsible for a set of database tables. In an embodiment, this is accomplished by using consistent hashing with virtual nodes that permits a node to be treated as a write-through cache for the queue, eliminating the need to read the items in the queue from the metadata store.

Figure 3:
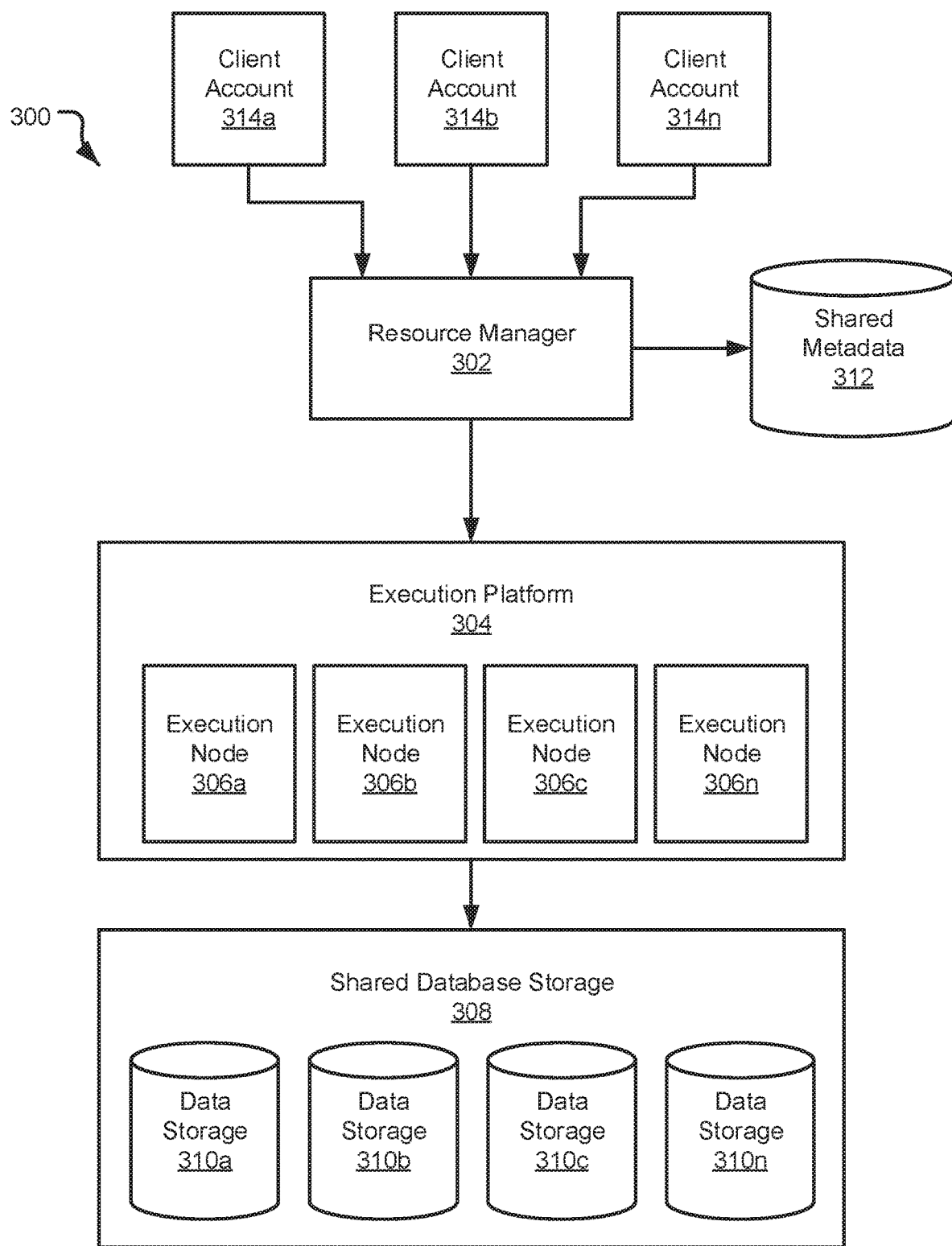
FIG. 3 is a block diagram of components of a retrieval and data storage system in accordance with the teachings and principles of the disclosure.

Referring now to FIG. 3, a data processing platform 300 is illustrated for running the methods disclosed herein. As shown in FIG. 3, resource manager 302 may be coupled to multiple client accounts 314a, 314b, and 314n. In particular implementations, resource manager 302 can support any number of client accounts desiring access to the execution platform 304 and/or or shared database storage 308. Client accounts 314a, 314b, and 314n may include, for example, end users providing user files to be ingested into the database, data storage and retrieval requests, system administrators managing the systems and methods described herein, and other components/devices that interact with resource manager 302.

Resource manager 302 provides various services and functions that support the operation of all systems and components within data processing platform 300. Resource manager 302 may be coupled to shared metadata 312, which is associated with the entirety of data stored throughout data processing platform 300. In some embodiments, shared metadata 312 may include a summary of data stored in remote data storage systems as well as data available from a local cache. Additionally, shared metadata 312 may include information regarding how data is organized in the remote data storage systems and the local caches. Shared metadata 312 may allow systems and services to determine whether a piece of data needs to be processed without loading or accessing the actual data from a storage device.

Resource manager 302 may be further coupled to the execution platform 304, which provides multiple computing resources that execute various data storage and data retrieval tasks, as discussed in greater detail below. The execution platform 304 includes a plurality of execution nodes 306a, 306b, 306c, and 306n configured to process various tasks associated with the database, including ingesting new user files and generating one or more micro-partitions for a table of a database based on the new user files. Execution platform 304 may be coupled to shared database storage 308 including multiple data storage devices 310a, 310b, 310c, and 310n. In some embodiments, the shared database storage 308 includes cloud-based storage devices located in one or more geographic locations. For example, the shared database storage 308 may be part of a public cloud infrastructure or a private cloud infrastructure. The shared database storage 308 may include hard disk drives (HDDs), solid state drives (SSDs), storage clusters or any other data storage technology. Additionally, shared database storage 308 may include distributed file systems (such as Hadoop Distributed File Systems (HDFS)), object storage systems, and the like. It should be appreciated that the shared database storage 308 may be accessible by one or more instances of the resource manager 302 but may not be accessible by all client accounts 314a-314n. In an embodiment, a single instance of the resource manager 302 is shared by a plurality of client accounts 314a-314n. In an embodiment, each client account 314a-314n has its own resource manager and/or its own shared database storage 308 that is shared amongst a plurality of execution nodes 306a-306n of the execution platform 304. In an embodiment, the resource manager 302 is responsible for providing a particular client account 314a-314n access to particular data within the shared database storage 308.

In particular embodiments, the communication links between resource manager 302 and client accounts 314a-314n, shared metadata 312, and execution platform 304 are implemented via one or more data communication networks. Similarly, the communication links between execution platform 304 and shared database storage 308 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 3, data storage devices 310a-310n are decoupled from the computing resources associated with execution platform 304. This architecture supports dynamic changes to data processing platform 300 based on the changing data storage/retrieval needs as well as the changing needs of the users and systems accessing data processing platform 300. The support of dynamic changes allows data processing platform 300 to scale quickly in response to changing demands on the systems and components within data processing platform 300. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

Resource manager 302, shared metadata 312, execution platform 304, and shared database storage 308 are shown in FIG. 3 as individual components. However, each of resource manager 302, shared metadata 312, execution platform 304, and shared database storage 308 may be implemented as a distributed system (e.g., distributed across multiple systems/platforms at multiple geographic locations). Additionally, each of resource manager 302, shared metadata 312, execution platform 304, and shared database storage 308 can be scaled up or down (independently of one another) depending on changes to the requests received from client accounts 314a-314n and the changing needs of data processing platform 300. Thus, data processing platform 300 is dynamic and supports regular changes to meet the current data processing needs.

Figure 4:
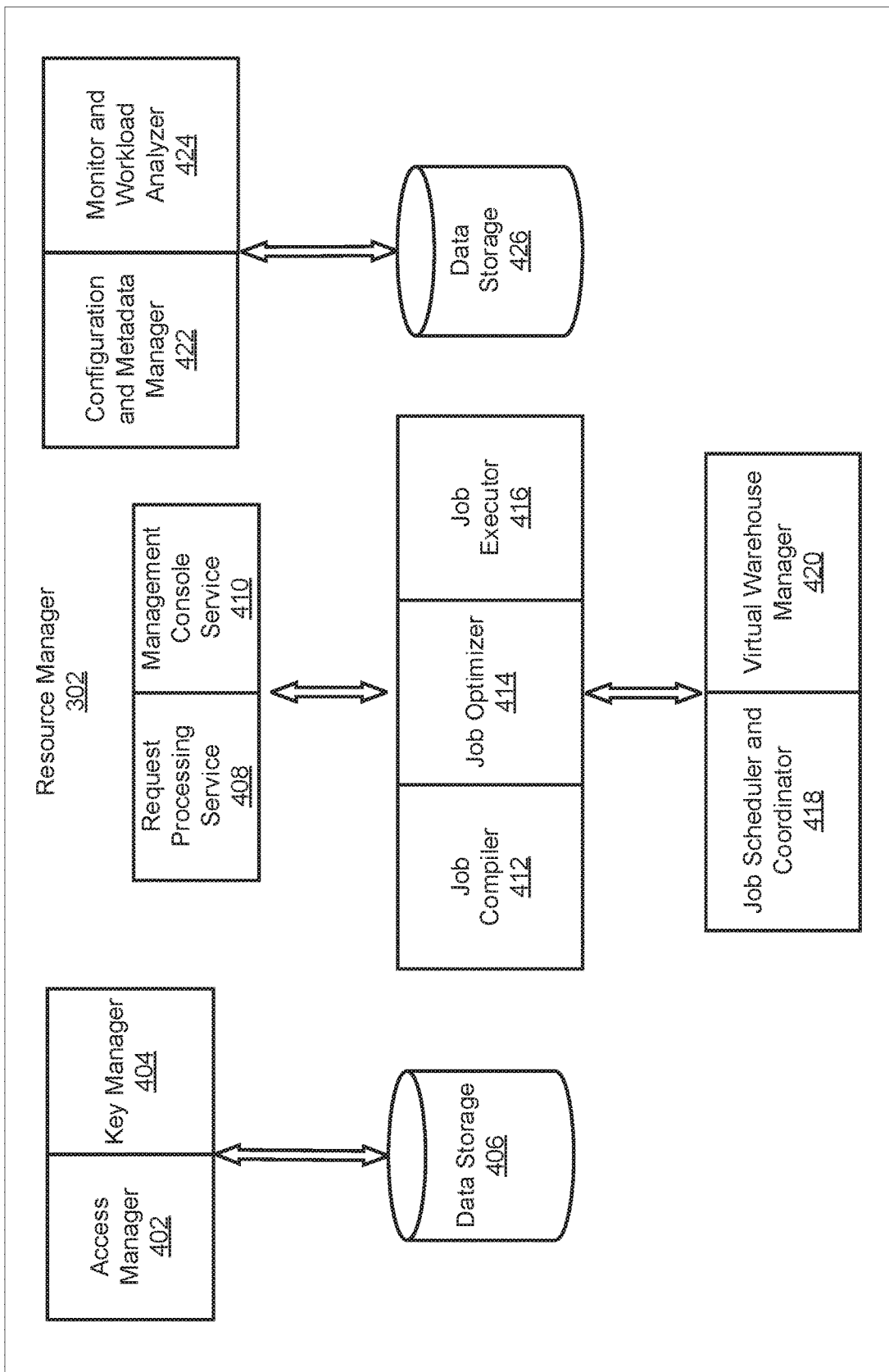
FIG. 4 is a block diagram of an embodiment of a resource manager in accordance with the teachings and principles of the disclosure.

FIG. 4 is a block diagram depicting an embodiment of resource manager 302. As shown in FIG. 4, resource manager 302 includes an access manager 402 and a key manager 404 coupled to a data storage device 406. Access manager 402 may handle authentication and authorization tasks for the systems described herein. Key manager 404 may manage storage and authentication of keys used during authentication and authorization tasks. A request processing service 408 manages received data storage requests and data retrieval requests. A management console service 410 supports access to various systems and processes by administrators and other system managers.

Resource manager 302 may also include a job compiler 412, a job optimizer 414 and a job executor 416. Job compiler 412 parses tasks, such as ingest tasks, and generates the execution code for the ingestion of user files. Job optimizer 414 determines the best method to execute ingest tasks based on the data that needs to be processed and/or ingested. Job executor 416 executes code for ingest tasks received by resource manager 302. A job scheduler and coordinator 418 may send received user files to the appropriate services or systems for compilation, optimization, and dispatch to the execution platform 304. A virtual warehouse manager 420 manages the operation of multiple virtual warehouses implemented in an execution platform.

Additionally, resource manager 302 includes a configuration and metadata manager 422, which manages the information related to the data stored in the remote data storage devices and in the local caches. A monitor and workload analyzer 424 oversees the processes performed by resource manager 302 and manages the distribution of tasks (e.g., workload) across the virtual warehouses and execution nodes in the execution platform. Configuration and metadata manager 422 and monitor and workload analyzer 424 are coupled to a data storage device 426.

Figure 5:
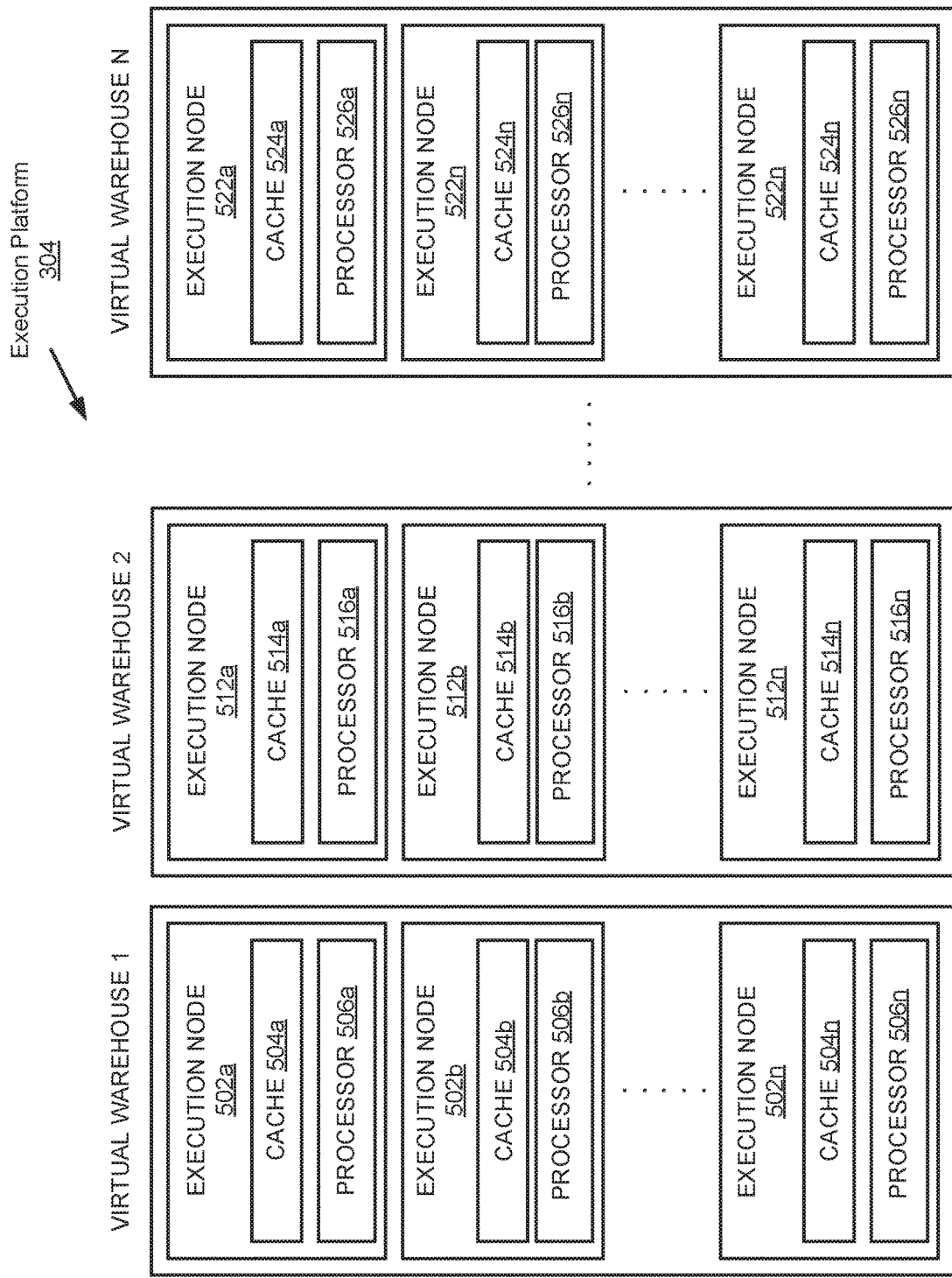
FIG. 5 is a block diagram of an embodiment of an execution platform in accordance with the teachings and principles of the disclosure.

FIG. 5 is a block diagram depicting an embodiment of an execution platform 304. As shown in FIG. 5, execution platform 304 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, execution platform 304 can add new virtual warehouses and drop existing virtual warehouses in real-time based on the current processing needs of the systems and users. This flexibility allows the execution platform 304 to quickly deploy large amounts of computing resources when needed without being forced to continue paying for those computing resources when they are no longer needed. All virtual warehouses can access data from any data storage device (e.g., any storage device in shared database storage 308). Although each virtual warehouse shown in FIG. 5 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 310a-310n shown in FIG. 3. Thus, the virtual warehouses are not necessarily assigned to a specific data storage device and, instead, can access data from any of the data storage devices 310a-310n within the shared database storage 308. Similarly, each of the execution nodes shown in FIG. 5 can access data from any of the data storage devices 310a-310n, In some embodiments, a particular virtual warehouse or a particular execution node may be temporarily assigned to a specific data storage device, but the virtual warehouse or execution node may later access data from any other data storage device.

In the example of FIG. 5, virtual warehouse 1 includes three execution nodes 502a, 502b, and 502n. Execution node 502a includes a cache 504b and a processor 506a. Execution node 502b includes a cache 504b and a processor 506b. Execution node 502n includes a cache 504n and a processor 506n. Each execution node 502a, 502b, and 502n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 512a, 512b, and 512n. Execution node 512a includes a cache 514a and a processor 516a. Execution node 512b includes a cache 514b and a processor 516b. Execution node 512n includes a cache 514n and a processor 516n. Additionally, virtual warehouse 3 includes three execution nodes 522a, 522b, and 522n. Execution node 522a includes a cache 524a and a processor 526a. Execution node 522b includes a cache 524b and a processor 526b. Execution node 522n includes a cache 524n and a processor 526n.

In some embodiments, the execution nodes shown in FIG. 5 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 5 each include one data cache and one processor, alternate embodiments may include execution nodes containing any number of processors and any number of caches. Additionally, the caches may vary in size among the different execution nodes. The caches shown in FIG. 5 store, in the local execution node, data that was retrieved from one or more data storage devices in the shared database storage 308. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in the shared database storage 308.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 304, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 5 as having multiple execution nodes. The multiple execution nodes associated with each virtual warehouse may be implemented using multiple computing systems at multiple geographic locations. For example, an instance of virtual warehouse 1 implements execution nodes 502a and 502b on one computing platform at a geographic location and implements execution node 502n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 304 is also fault tolerant. For example, if one virtual warehouse fails, that virtual warehouse is quickly replaced with a different virtual warehouse at a different geographic location.

A particular execution platform 304 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the shared database storage 308 but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 6:
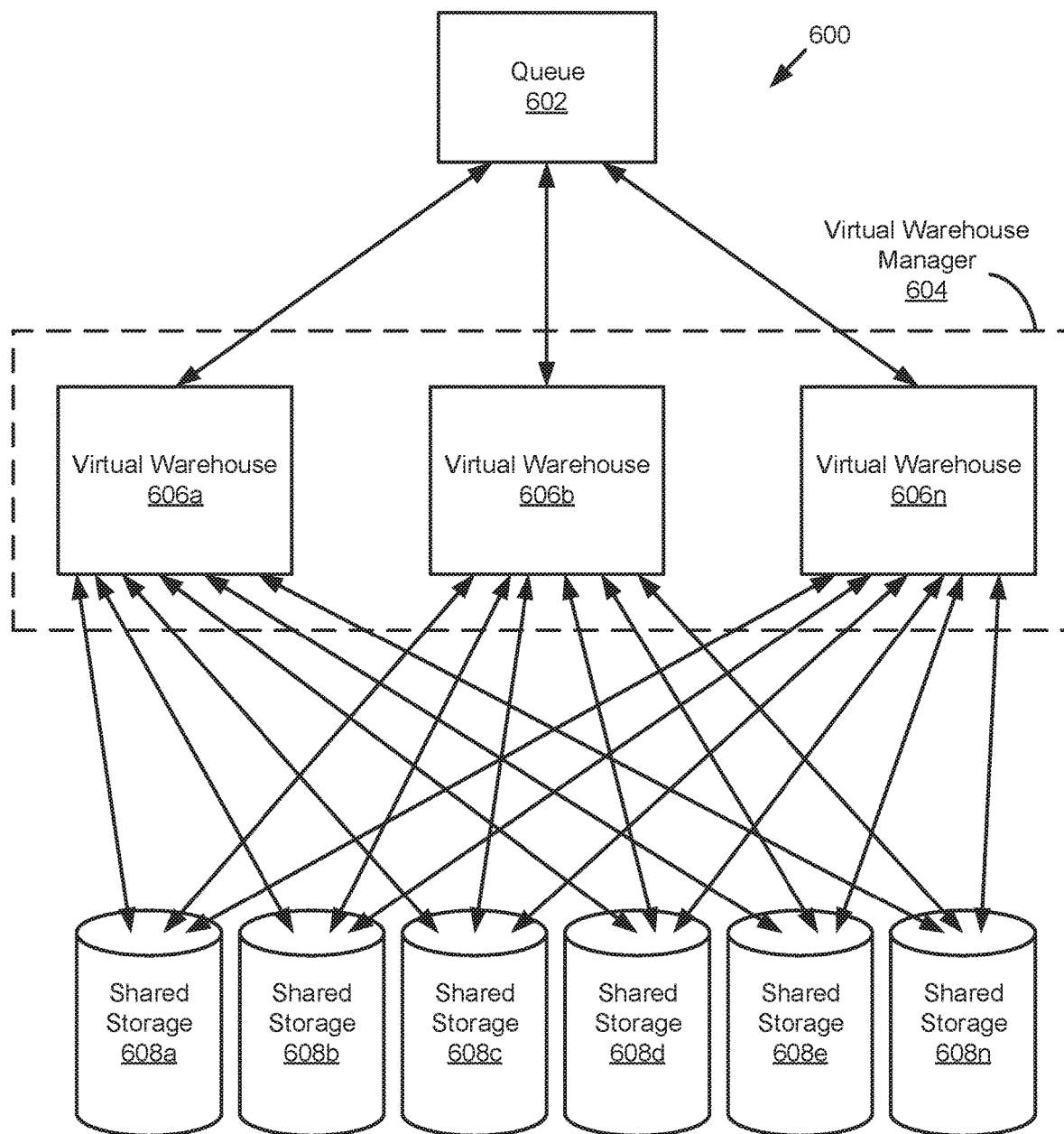
FIG. 6 is a block diagram illustrating components of an operating environment in accordance with the teachings and principles of the disclosure.

FIG. 6 is a block diagram depicting an example operating environment 600 with the queue 602 in communication with multiple virtual warehouses under a virtual warehouse manager 502. In environment 600, the queue 602 has access to multiple database shared storage devices 608a, 608b, 608c, 608d, 608e, and 608n through multiple virtual warehouses 606a, 606b, and 606n. Although not shown in FIG. 6, the queue 602 may access virtual warehouses through the resource manager 302. In particular embodiments, databases 608a-608n are contained in the shared database storage 308 and are accessible by any virtual warehouse implemented in the execution platform 212. in some embodiments, the queue 602 may access one of the virtual warehouses 606a-606n using a data communication network such as the Internet. In some implementations, a client account may specify that the queue 602 (configured for storing internal jobs to be completed) should interact with a particular virtual warehouse 606a-606n at a particular time.

In an embodiment (as illustrated), each virtual warehouse 606a-606n can communicate with all databases 608a-608n. In some embodiments, each virtual warehouse 606a-606n is configured to communicate with a subset of all databases 608a-608n, In such an arrangement, an individual client account associated with a set of data may send all data retrieval and data storage requests through a single virtual warehouse and/or to a certain subset of the databases 608a-608n. Further, where a certain virtual warehouse 606a-606n is configured to communicate with a specific subset of databases 608a-608n, the configuration is dynamic. For example, virtual warehouse 606a may be configured to communicate with a first subset of databases 608a-608n and may later be reconfigured to communicate with a second subset of databases 608a-608n.

In an embodiment, the queue 602 sends data retrieval, data storage, and data processing requests to the virtual warehouse manager 604, which routes the requests to an appropriate virtual warehouse 606a-606n. In some implementations, the virtual warehouse manager 604 provides a dynamic assignment of jobs to the virtual warehouses 606a-606n.

In some embodiments, fault tolerance systems create a new virtual warehouse in response to a failure of a virtual warehouse. The new virtual warehouse may be in the same virtual warehouse group or may be created in a different virtual warehouse group at a different geographic location.

The systems and methods described herein allow data to be stored and accessed as a service that is separate from computing (or processing) resources. Even if no computing resources have been allocated from the execution platform 212, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Figure 7:
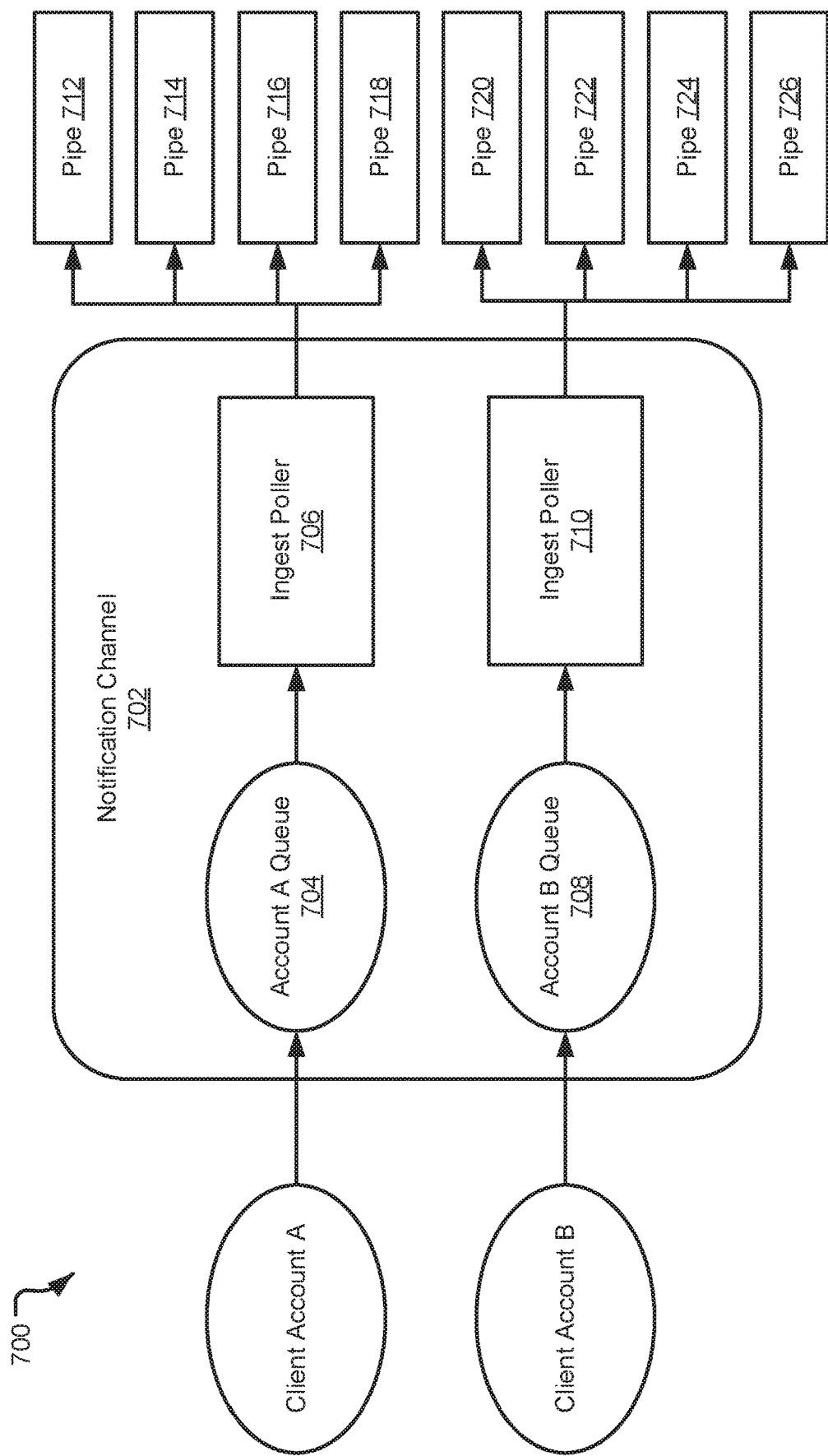
FIG. 7 is a block diagram of a batch data ingestion system in accordance with the teachings and principles of the disclosure.

FIG. 7 is a block diagram architecture model of a system for automated data ingestion 700. The system 700 includes a plurality of client accounts, including for example client account A and client account B. The client accounts may include one or more data buckets or data lakes comprising user files. Each of the client accounts is coupled to a client account queue comprising a listing of all user files to be ingested into a database. As illustrated in FIG. 7, client account A is coupled to account A queue 704 and client account B is coupled to account B queue 708. In an alternative embodiment, a plurality of client accounts may feed into one or more client account queues. An ingest poller 706, 710 is associated with each of the client accounts. In an embodiment, an ingest poller 706, 710 may poll a queue for one or more client accounts. As illustrated in FIG. 7, ingest pollen 706 is responsible for polling account A queue 704 and ingest poller 710 is responsible for polling account B queue 708. Each ingest poller may poll across a number of client account queues. The ingest poller 706, 710 may inspect a notification received from a client account queue and match the notification against all available pipes 712, 714, 716, 718, 720, 722, 724, and 726. The ingest poller 706, 710 is responsible for delivering the notification to each of the matching pipes 712-726 such that the associated user file may be retrieved from the client account and delivered to the appropriate pipe. The client account queues and the associated ingest pollers are embodied within a notification channel 702.

In an embodiment the ingest poller 706, 710 conducts a polling or polled operation. In an embodiment, the ingest poller 706, 710 is a piece of functionality existing within a resource manager 302. The ingest poller 706, 710 may inspect each notification from a client account queue 704, 708, and for each message the ingest poller 706, 710 will match the notification against each pipe 712-726. The ingest poller 706, 710 will deliver the notification to each of the matching pipes 712-726.

In an embodiment, the system 700 includes a plurality of client account queues comprising a pool of Simple Queue Service™ (SQS) queues as part of an Amazon Web Services™ S3 bucket. The pool of SQS queues may be provided to client accounts to add user files to a bucket. A notification may be automatically generated when one or more user files are added to a client account data bucket. A plurality of customer data buckets may be provided to each client account. The client account queues 704, 708 may handle data events (i.e. the receipt of one or more user files) from a number of data buckets for a client account. A client account may include a plurality of data buckets that will have one or more dedicated client account queues 704, 708 for that client account. In an embodiment, each client account queue 704, 708 handles events from a plurality of data buckets for a single client account that will receive user files for a plurality of pipes 712-726. In an embodiment, each ingest poller 706. 710 polls across a number of client account queues 704, 708 and is not dedicated to a single client account queue 704, 708 as illustrated in FIG. 7.

In an embodiment, the creation of a pipe 712-726 occurs at either of an external stage or an internal stage. If two pipes are created with the same matching conditions, an applicable user file will be loaded into both pipes. In an embodiment, when a client drops a pipe 712-726, if there are other pipes that are being auto-ingested from the same client data bucket, there will be no output. If the pipe 712-726 being dropped is the last pipe that is being auto-ingested for the client data bucket, then the queue configuration will be removed from the bucket notification configuration.

In an embodiment, there exist policy limitations on the client account queue such that the client account queue will need to be configured with a policy to accept messages from a client data bucket. In an embodiment, for a client data bucket to be able to send a creation event to the client account queue one of the following must be true: the client data bucket should be allowed from the principal, or the client data bucket source must be allowed in the condition. If the client data bucket is allowed from the principal, then all entities from that client account will be able to do a send message on the client account queue. Thus, to restrict only the client data bucket to send notifications, the condition may be set to point to the client data bucket name.

In an embodiment, there are multiple client account queues for a single client account. This may be beneficial in an embodiment where having a single client account queue for all possible client accounts would require the single client account queue to be shared across many client data buckets and the single client account queue may not be able to handle a great plurality of client data buckets.

In an embodiment, the system 700 maintains a pool of client account queues for each client account. Each client account queue may service a number of stages and pipes 712-726. Each instance of the resource manager 302 will build a token ring for one or more client account queues and will watch that range of tokens that are assigned to the applicable client account queues, and will further poll those client account queues.

In an embodiment, whenever a pipe 712-726 is configured to automatically ingest, the ingest request is redirected to the instance of the resource manager 302 that is currently handling provisioning of user files. Once the correct instance of the resource manager 302 receives the ingest request, it may read all client account queues that it has from cache. The instance of the resource manager 302 may further check if one of the client account queues already has an existing ingest policy for an applicable client data bucket. If so, it may increment the reference for that client account queue in metadata store and return that client account queue. The instance of the resource manager 302 may further determine if no client account queue has an existing policy and implement a client account queue selection policy to either select an existing client account queue or create a new client account queue. This may include adding a policy to the client account queue to provision a new client account queue for that client account under certain circumstances. It may further increment the reference for the client account queue in metadata store and return that client account queue.

In an embodiment, the client account queue selection policy includes grouping the client account queues by client account. In an embodiment, this includes using just one client account queue, but if there are multiple client account queues for a client account, the client account queue selection policy includes selecting one client account with the least number of client data buckets. The client account queue selection policy may further include selecting client account queues by token range-based grouping. This may include using metrics on a token range identifying which client account queues are seeing a lot of traffic and select one client account queue that has been seeing the least amount of traffic. It may further include determining the number of client data buckets that are on different client account queues and selecting one client account queue with the least number of client data buckets.

In an embodiment, each objection creation notification message comprises the client data bucket name and full object name providing the complete path of an object (i.e. a user file) in a client data bucket. A single client account queue may feed into several pipes with each pipe having a set of matching rules.

The client account queues are a message queuing service that decouples and scales microservices, distributed systems, and serverless applications. In an embodiment, the client account queues 704, 708 are an Amazon® Simple Queue Service (SQS) provided by Amazon Web Services®. The SQS enables building applications from individual components that each perform a discrete function for improving scalability and reliability. SQS can improve the cost-effectiveness of decoupling and coordinating components of a cloud application. With SQS, a client may send, store, and receive messages between software components at any volume, without losing messages or requiring other services to be always available.

In an embodiment, SQS may provide two types of message queues, including a standard queue and a FIFO queue. The standard queue offers maximum throughput, best-effort ordering, and at-least-once-delivery of message. FIFO (First In First Out) queues are designed to guarantee that messages are processed exactly once, in the exact order that they are sent, with limited throughput.

Figure 8:
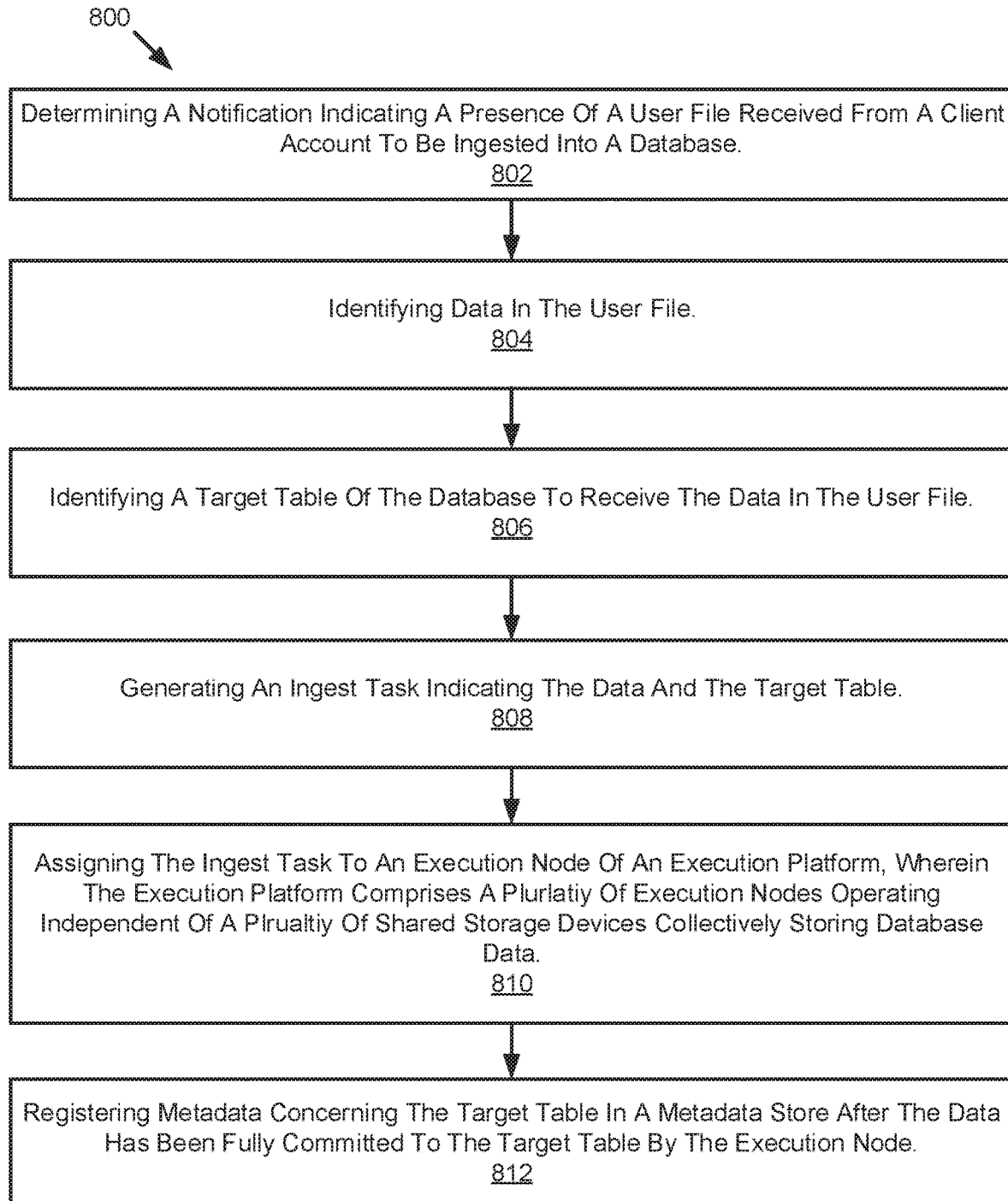
FIG. 8 is a schematic flow chart diagram of a method for batch data ingestion to a database in accordance with the teachings and principles of the disclosure.

FIG. 8 is a schematic flow chart diagram of a method 800 for batch data ingestion into a database. The method 800 may be performed by any suitable computing device such as a resource manager 302 as disclosed herein. The method 800 begins and the resource manager determines at 802 a notification indicating a presence of a user file received from a client account to be ingested into a database. The method 800 continues and the resource manager identifies at 804 data in the user file and identifies at 806 a target table of the database to receive the data in the user file. The method 800 continues and the resource manager generates at 808 an ingest task indicating the data and the target table. The method 800 continues and the resource manager assigns at 810 the ingest task to an execution node of an execution platform, wherein the execution platform comprises a plurality of execution nodes operating independent of a plurality of shared storage devices collectively storing database data. The method 800 continues and the resource manager register at 812 metadata concerning the target table in a metadata store after the data has been fully committed to the target table by the execution node.

The method 800 may be executed autonomously without user intervention. The method 800 may include the execution of multiple ingest tasks asynchronously across the execution platform such that the multiple ingest tasks are executed substantially in parallel.

Figure 9:
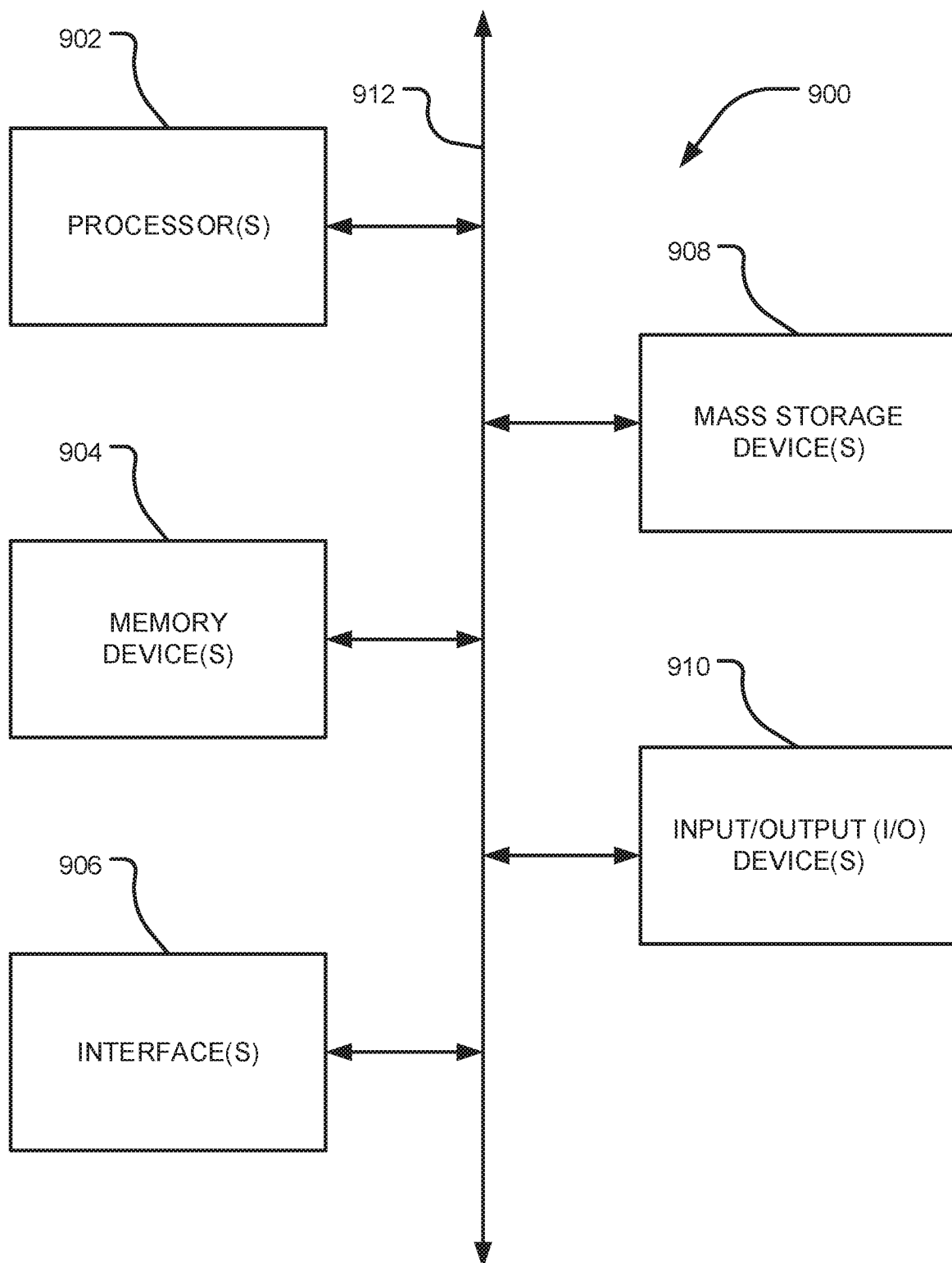
FIG. 9 is a block diagram of an example computing device consistent with the enabling disclosure of the computer processes taught herein.

FIG. 9 is a block diagram depicting an example computing device 900. In some embodiments, computing device 900 is used to implement one or more of the systems and components discussed herein. For example, computing device 900 may allow a user or administrator to access the resource manager 902. Further, computing device 900 may interact with any of the systems and components described herein. Accordingly, computing device 900 may be used to perform various procedures and tasks, such as those discussed herein. Computing device 900 can function as a server, a client or any other computing entity. Computing device 900 can be any of a wide variety of computing devices, such as a desktop computer, a notebook computer, a server computer, a handheld computer, a tablet, and the like.

Computing device 900 includes one or more processor(s) 902, one or more memory devices) 904, one or more interface(s) 906, one or more mass storage device(s) 908, and one or more Input/Output (I/O) device(s) 910, all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM)) and/or nonvolatile memory (e.g., read-only memory (ROM)). Memory device(s) 904 may also include rewritable ROM, such as Flash memory.

Mass storage device(s) 908 include various computer readable media, such as magnetic tapes, magnetic disks, optical disks, solid state memory (e.g., Flash memory), and so forth. Various drives may also be included in mass storage device(s) 908 to enable reading from and/or writing to the various computer readable media. Mass storage device(s) 908 include removable media and/or non-removable media.

I/O device(s) 910 include various devices that allow data and/or other information to be input to or retrieved from computing device 900, Example I/O device(s) 910 include cursor control devices, keyboards, keypads, microphones, monitors or other display devices, speakers, printers, network interface cards, modems, lenses, CCDs or other image capture devices, and the like.

Interface(s) 906 include various interfaces that allow computing device 900 to interact with other systems, devices, or computing environments. Example interface(s) 906 include any number of different network interfaces, such as interfaces to local area networks (LANs), wide area networks (WANs), wireless networks, and the Internet.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the term "module" is intended convey the implementation apparatus for accomplishing a process, such as by hardware, or a combination of hardware, software, and/or firmware, for the purposes of performing all or parts of query operations.

The systems and methods described herein allow data to be stored and accessed as a service that is separate from computing (or processing) resources. Even if no computing resources have been allocated from the execution platform, data is available to a virtual warehouse without requiring reloading of the data from a remote data source. Thus, data is available independently of the allocation of computing resources associated with the data. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

EXAMPLES

The following Examples pertain to further embodiments:

Example 1 is a system for batch data ingestion into a database, the system including means for determining a notification indicating a presence of a user file received from a client account to be ingested into a database. The system further includes means for identifying data in the user file and means for identifying a target table of the database to receive the data in the user file. The system includes means for generating an ingest task indicating the data and the target table. The system includes means for assigning the ingest task to an execution node of an execution platform, wherein the execution platform comprises a plurality of execution nodes operating independent of a plurality of shared storage devices collectively storing database data. The system includes means for registering metadata concerning the target table in a metadata store after the data has been fully committed to the target table by the execution node.

Example 2 is a system as in Example 1, further comprising means for committing the user file to a client account queue, and wherein the means for determining the notification indicating the presence of the user file comprises determining by polling the client account queue to determine whether any new user files have been committed to the client account queue since a last time the client account queue was polled.

Example 3 is a system as in any of Examples 1-2, wherein the means for determining the notification indicating the presence of the user file is configured to determine by receiving a notification from a data lake indicating the user file has been added.

Example 4 is a system as in any of Examples 1-3, further comprising: means for identifying a current total number of active ingest tasks and a desired number of active ingest tasks; and means for managing the plurality of execution nodes of the execution platform such that the current total number of active ingest tasks is equal to or approaches the desired number of active ingest tasks by one or more of: smoothing demand for the plurality of execution nodes over time by way of a moving average; or maintaining an execution platform having more than a required number of active execution nodes for processing the current total number of active ingest tasks.

Example 5 is a system as in any of Examples 1-4, further comprising means for generating an ingest history comprising an indication of whether data from one or more user files is successfully stored in the database, wherein the ingest history is stored in a metadata store, and wherein the ingest history comprises one or more of a file name, a table identification, a file size, a row count, or an ingest error code.

Example 6 is a system as in any of Examples 1-5, further comprising means for assigning the user file to an instance of a resource manager based on consistent hashing, wherein a hash of the consistent hashing is associated with a table identification of the target table, and wherein the instance of the resource manager is assigned to manage processes for the hash associated with the target table.

Example 7 is a system as in any of Examples 1-6, further comprising means for adding a new instance of a resource manager, wherein adding the new instance of the resource manager comprises dividing a plurality of hashes of the consistent hashing and assigning each of the plurality of hashes to a plurality of instances of resource managers such that each instance of the plurality of instances is assigned an equal or nearly equal number of tables.

Example 8 is a system as in any of Examples 1-7, further comprising means for committing the user file to a client account queue, and wherein the means for generating the ingest task is configured to generate one or more ingest tasks based on an amount of work in the client account queue, wherein the amount of work in the client account queue is determined. based on one or more of an approximate size of the user file based on an average size of recently ingested user files from the client account; a number of user files in the client account queue; or a size of the user file as indicated by the client account.

Example 9 is a system as in any of Examples 1-8, wherein the data is committed to the target table by generating a new micro-partition for the target table, wherein the new micro-partition is stored in the plurality of shared storage devices only after the data is fully and successfully inserted.

Example 10 is a system as in any of Examples 1-9, wherein the means for assigning the task to the execution node of the execution platform is configured to manage a total number of tasks being processed by the execution platform by on one or more of: delaying assigning the ingest task to the execution node when a threshold number of tasks are already being processed by the execution platform; building optimally sized micro-partitions by delaying assigning the ingest task to the execution node until a threshold number of new user files has been committed to a client account queue; minimizing latency by assigning the ingest task to the execution node as soon as the user files is committed to the client account queue; or minimizing processing overhead of starting and stopping ingest tasks by delaying assigning the ingest task to the execution node until a threshold number of new user files has been committed to the client account queue.

Example 11 is a system as in any of Examples 1-10, wherein managing the total number of tasks being processed by the execution platform comprises balancing a plurality of latency factors to ensure customer latency remains below a threshold level while the total number of tasks is minimized.

Example 12 is a method for batch data ingestion into a database. The method includes determining a notification indicating a presence of a user file received from a client account to be ingested into a database. The method includes identifying data in the user file and identifying a target table of the database to receive the data in the user file. The method includes generating an ingest task indicating the data and the target table. The method includes assigning the ingest task to an execution node of an execution platform, wherein the execution platform comprises a plurality of execution nodes operating independent of a plurality of shared storage devices collectively storing database data. The method includes registering metadata concerning the target table in a metadata store after the data has been fully committed to the target table by the execution node.

Example 13 is a method as in Example 12, further comprising committing the user file to a client account queue, and wherein determining the notification indicating the presence of the user file comprises determining by polling the client account queue to determine whether any new user files have been committed to the client account queue since a last time the client account queue was polled.

Example 14 is a method as in any of Examples 12-13, wherein determining the notification indicating the presence of the user file is configured to determine by receiving a notification from a data lake indicating the user file has been added.

Example 15 is a method as in any of Examples 12-14, further comprising: identifying a current total number of active ingest tasks and a desired number of active ingest tasks; and managing the plurality of execution nodes of the execution platform such that the current total number of active ingest tasks is equal to or approaches the desired number of active ingest tasks by one or more of: smoothing demand for the plurality of execution nodes over time by way of a moving average; or maintaining an execution platform having more than a required number of active execution nodes for processing the current total number of active ingest tasks.

Example 16 is a method as in any of Examples 1-5, further comprising generating an ingest history comprising an indication of whether data from one or more user files is successfully stored in the database, wherein the ingest history is stored in a micro-partition of a table of the database, and wherein the ingest history comprises one or more of a file name, a table identification, a file size, a row count, or an ingest error code.

Example 17 is a method as in any of Examples 12-16, further comprising assigning the user file to an instance of a resource manager based on consistent hashing, wherein a hash of the consistent hashing is associated with the user file and the target table, and wherein the instance of the resource manager is assigned to manage processes for the hash associated with the target table.

Example 18 is a method as in any of Examples 12-17, further comprising adding a new execution node to the execution platform, wherein adding the new execution node comprises dividing a plurality of hashes of the consistent hashing and assigning each of the plurality of hashes to the plurality of execution nodes such that each cation node of the plurality of execution nodes is assigned an equal or nearly equal number of tables based on the consistent hashing.

Example 19 is a method as in any of Examples 12-18, further comprising committing the user file to a client account queue, and wherein generating the ingest task comprises generating one or more ingest tasks based on an amount of work in the client account queue, wherein the amount of work in the client account queue is determined based on one or more of: an approximate size of the user file based on an average size of recently ingested user files from the client account; or a size of the user file as indicated by the client account.

Example 20 is a method as in any of Examples 12-19, wherein the data is committed to the target table by generating a new micro-partition for the target table, wherein the new micro-partition is stored in the plurality of shared storage devices only after the data is fully and successfully inserted.

Example 21 is a method as in any of Examples 12-20, wherein assigning the task to the execution node of the execution platform further comprises managing a total number of tasks being processed by the execution platform by on one or more of: delaying assigning the ingest task to the execution node when a threshold number of tasks are already being processed by the execution platform; building optimally sized micro-partitions by delaying assigning the ingest task to the execution node until a threshold number of new user files has been committed to a client account queue; minimizing latency by assigning the ingest task to the execution node as soon as the user files is committed to the client account queue; or minimizing processing overhead of starting and stopping ingest tasks by delaying assigning the ingest task to the execution node until a threshold number of new user files has been committed to the client account queue.

Example 22 is a method as in any of Examples 12-21, wherein managing the total number of tasks being processed by the execution platform comprises balancing a plurality of latency factors to ensure customer latency remains above a threshold level while the total number of tasks is minimized.

Example 23 is a processor that is programmable to execute instructions stored in non-transitory computer readable storage media. The instructions include determining a notification indicating a presence of a user file received from a client account to be ingested into a database. The instructions include identifying data in the user file and identifying a target table of the database to receive the data in the user file. The instructions include generating an ingest task indicating the data and the target table. The instructions include assigning the ingest task to an execution node of an execution platform, wherein the execution platform comprises a plurality of execution nodes operating independent of a plurality of shared storage devices collectively storing database data. The instructions include registering metadata concerning the target table in a metadata store after the data has been fully committed to the target table by the execution node.

Example 24 is a processor as in Example 23, wherein the instructions further comprise committing the user file to a client account queue, and wherein determining the notification indicating the presence of the user file comprises determining by polling the client account queue to determine whether any new user files have been committed to the client account queue since a last time the client account queue was polled.

Example 25 is a processor as in any of Examples 23-24, wherein determining the notification indicating the presence of the user file is configured to determine by receiving a notification from a data lake indicating the user file has been added.

Example 26 is a processor as in any of Examples 23-25, wherein the instructions further comprise: identifying a current total number of active ingest tasks and a desired number of active ingest tasks; and managing the plurality of execution nodes of the execution platform such that the current total number of active ingest tasks is equal to or approaches the desired number of active ingest tasks by one or more of: smoothing demand for the plurality of execution nodes over time by way of a moving average; or maintaining an execution platform having more than a required number of active execution nodes for processing the current total number of active ingest tasks.

Example 27 is a processor as in any of Examples 23-26, wherein the instructions further comprise generating an ingest history comprising an indication of whether data from one or more user files is successfully stored in the database, wherein the ingest history is stored in a micro-partition of a table of the database, and wherein the ingest history comprises one or more of a file name, a table identification, a file size, a row count, or an ingest error code.

Example 28 is a processor as in any of Examples 23-27, wherein the instructions further comprise assigning the user file to an instance of a resource manager based on consistent hashing, wherein a hash of the consistent hashing is associated with the user file and the target table, and wherein the instance of the resource manager is assigned to manage processes for the hash associated with the target table.

Example 29 is a processor as in any of Examples 23-28, wherein the instructions further comprise adding a new execution node to the execution platform, wherein adding the new execution node comprises dividing a plurality of hashes of the consistent hashing and assigning each of the plurality of hashes to the plurality of execution nodes such that each execution node of the plurality of execution nodes is assigned an equal or nearly equal number of tables based on the consistent hashing.

Example 30 is a processor as in any of Examples 23-29, wherein the instructions further comprise committing the user file to a client account queue, and wherein generating the ingest task comprises generating one or more ingest tasks based on an amount of work in the client account queue, wherein the amount of work in the client account queue is determined based on one or more of: an approximate size of the user file based on an average size of recently ingested user files from the client account; or a size of the user file as indicated by the client account.

Example 31 is a processor as in any of Examples 23-30, wherein the data is committed to the target table by generating a new micro-partition for the target table, wherein the new micro-partition is stored in the plurality of shared storage devices only after the data is fully and successfully inserted.

Example 32 is a processor as in any of Examples 23-31, wherein assigning the task to the execution node of the execution platform further comprises managing a total number of tasks being processed by the execution platform by on one or more of: delaying assigning the ingest task to the execution node when a threshold number of tasks are already being processed by the execution platform; building optimally sized micro-partitions by delaying assigning the ingest task to the execution node until a threshold number of new user files has been committed to a client account queue; minimizing latency by assigning the ingest task to the execution node as soon as the user files is committed to the client account queue; or minimizing processing overhead of starting and stopping ingest tasks by delaying assigning the ingest task to the execution node until a threshold number of new user files has been committed to the client account queue.

Example 33 is a processor as in any of Examples wherein managing the total number of tasks being processed by the execution platform comprises balancing a plurality of latency factors to ensure customer latency remains above a threshold level while the total number of tasks is minimized.

In an embodiment of the disclosure, a system provides continuous data ingestion to a database or table. In such an embodiment, the system includes a client account comprising a data bucket. The client account may be attached to an S3 bucket that may be in communication with an SQS queue. The SQS queue may be in communication with a plurality of pipes. The system may receive a notification that an alteration has been made to the client data housed within the client's data bucket. The system may scale computing resources up and down as needed to accommodate the alteration made to the client data bucket. The system may automatically pull in data changes and ingest the data into the client's database or table. In an embodiment, the system automatically ingests data changes without receiving a specific command from a client account.

In an embodiment, the system automatically tracks data that has previously been ingested into a database table. The system may receive a notification from an S3 data bucket when a data file changes and compare that notification against data that has previously been ingested.

In an embodiment, the system provides for incremental data ingestion that protects against data loss if execution fails. In an embodiment, data is incrementally loaded such that data is automatically committed to the database after a certain number of native binary files has been reached. The system may store the status of data in metadata such that the system stores data concerning exactly what file has been ingested and at which position. In the event of execution failure, the system may restart from the file and position left off from previous ingestion and avoid re-ingesting data the system would do if a client account used an SQL command that failed midway, and the system may thereby avoid re-ingesting data.

The invention claimed is:

1. A method comprising:
obtaining, at a data system, an ingest request to ingest one or more files into a table;
after obtaining the ingest request and prior to the ingesting of the one or more files, persisting the one or more files in a file queue that corresponds to the table;
assigning the one or more files to one or more execution nodes to be ingested into the table;
operating an ingest puller to poll the file queue; and
ingesting, by the one or more execution nodes, the one or more files into one or more micro-partitions of the table via one or more pipes.

2. The method of claim 1, wherein operating the ingest poller further comprises:
polling a queue associated with a client account;
inspecting a notification received from the queue; and
determining at least one pipe, from the one or more pipes, that matches the notification.

3. The method of claim 2, further comprising:
delivering the notification to the at least one pipe;
retrieving a file from the client account; and
delivering the file to the at least one pipe.

4. The method of claim 1, further comprising:
associating the one or more pipes with a notification channel, each of the one or more pipes being assigned one or more target tables; and
directing file data from a data source to an applicable target table of the one or more assigned target tables.

5. The method of claim 4, wherein notifications are received via the notification channel associated with the data source, the data source receiving files comprising file data to be ingested.

6. The method of claim 1, wherein the file queue further corresponds to a client account, and the data system further comprises a second file queue that corresponds to a second client account and a second table.

7. The method of claim 1, further comprising:
registering metadata after the one or more files are ingested into the one or more micro-partitions of the table, the metadata identifying the one or more files and the one or more micro-partitions.

8. The method of claim 1, wherein each of the one or more micro-partitions comprises contiguous units of storage of a storage device.

9. The method of claim 1, wherein assigning the one or more files to the one or more execution nodes to be ingested into the table further comprises:
generating an ingest task for each of the one or more execution nodes, each generated ingest task identifying the table and one or more of the one or more files; and assigning each generated ingest task to an execution node in the one or more execution nodes, each generated ingest task comprising cutting a corresponding file into one or more partitions, generating a new micro-partition based on the corresponding file, or inserting the new micro-partition in a particular table.

10. The method of claim 9, wherein assigning each generated ingest task to an execution node in the one or more execution nodes further comprises:
assigning each generated ingest task to a different core of an execution node in the one or more execution nodes, each generated ingest task being single threaded.

11. The method of claim 4, wherein notifications are received via the notification channel associated with the data source, the data source receiving files comprising file data to be ingested.

12. The method of claim 1, wherein the file queue further corresponds to a client account, and the data system further comprises a second file queue that corresponds to a second client account and a second table.

13. A system comprising:
at least one processor; and
one or more non-transitory computer readable storage media containing instructions executable by the at least one processor for causing the at least one processor to perform operations comprising:
obtaining, at a data system, an ingest request to ingest one or more files into a table;
after obtaining the ingest request and prior to the ingesting of the one or more files, persisting the one or more files in a file queue that corresponds to the table;
assigning the one or more files to one or more execution nodes to be ingested into the table;
operating an ingest poller to poll the file queue; and
ingesting, by the one or more execution nodes, the one or more files into one or more micro-partitions of the table via one or more pipes.

14. The system of claim 13, wherein operating the ingest poller further comprises operations comprising:
polling a queue associated with a client account;
inspecting a notification received from the queue; and
determining at least one pipe, from the one or more pipes, that matches the notification.

15. The system of claim 14, wherein the operations further comprise:
delivering the notification to the at least one pipe;
retrieving a file from the client account; and
delivering the file to the at least one pipe.

16. The system of claim 13, further comprising:
associating the one or more pipes with a notification channel, each of the one or more pipes being assigned one or more target tables; and
directing file data from a data source to an applicable target table of the one or more assigned target tables.

17. The system of claim 13, wherein the operations further comprise:
registering metadata after the one or more files are ingested into the one or more micro-partitions of the table, the metadata identifying the one or more files and the one or more micro-partitions.

18. The system of claim 13, wherein each of the one or more micro-partitions comprises contiguous units of storage of a storage device.

19. The system of claim 13, wherein assigning the one or more files to the one or more execution nodes to be ingested into the table further comprises operations comprising:
generating an ingest task for each of the one or more execution nodes, each generated ingest task identifying the table and one or more of the one or more files; and
assigning each generated ingest task to an execution node in the one or more execution nodes, each generated ingest task comprising cutting a corresponding file into one or more partitions, generating a new micro-partition based on the corresponding file, or inserting the new micro-partition in a particular table.

20. The system of claim 19, wherein assigning each generated ingest task to an execution node in the one or more execution nodes further comprises:
assigning each generated ingest task to a different core of an execution node in the one or more execution nodes, each generated ingest task being single threaded.

21. A non-transitory computer readable storage media containing instructions executable by at least one processor for causing the at least one processor to perform operations comprising:
obtaining, at a database system, an ingest request to ingest one or more files into a table of a database;
after obtaining the ingest request and prior to the ingesting of the one or more files, persisting the one or more files in a file queue that corresponds to the table;
assigning the one or more files to one or more execution nodes to be ingested into the table;
operating an ingest poller to poll the file queue; and
ingesting, by the one or more execution nodes, the one or more files into one or more micro-partitions of the table via one or more pipes.

22. The non-transitory computer readable storage media of claim 21, wherein operating the ingest poller further comprises operations comprising:
polling a queue associated with a client account;
inspecting a notification received from the queue; and
determining at least one pipe, from the one or more pipes, that matches the notification.

23. The non-transitory computer readable storage media of claim 22, wherein the operations further comprise:
delivering the notification to the at least one pipe;
retrieving a file from the client account; and
delivering the file to the at least one pipe.

24. The non-transitory computer readable storage media of claim 21, further comprising:
associating the one or more pipes with a notification channel, each of the one or more pipes being assigned one or more target tables of the database; and
directing file data from a database source to an applicable target table of the one or more assigned target tables.

25. The non-transitory computer readable storage media of claim 24, wherein notifications are received via the notification channel associated with the database source, the database source receiving files comprising file data to be ingested into the database.

26. The non-transitory computer readable storage media of claim 21, wherein the file queue further corresponds to a client account, and the database system further comprises a second file queue that corresponds to a second client account and a second table.

27. The non-transitory computer readable storage media of claim 21, wherein the operations further comprise:
registering metadata after the one or more files are ingested into the one or more micro-partitions of the table, the metadata identifying the one or more files and the one or more micro-partitions.

28. The non-transitory computer readable storage media of claim 21, wherein each of the one or more micro-partitions comprises contiguous units of storage of a storage device.

29. The non-transitory computer readable storage media of claim 21, wherein assigning the one or more files to the one or more execution nodes to be ingested into the table further comprises operations comprising:
generating an ingest task for each of the one or more execution nodes, each generated ingest task identifying the table and one or more of the one or more files; and
assigning each generated ingest task to an execution node in the one or more execution nodes, each generated ingest task comprising cutting a corresponding file into one or more partitions, generating a new micro-partition based on the corresponding file, or inserting the new micro-partition in a particular table.

30. The non-transitory computer readable storage media of claim 29, wherein assigning each generated ingest task to an execution node in the one or more execution nodes further comprises:
assigning each generated ingest task to a different core of an execution node in the one or more execution nodes, each generated ingest task being single threaded.

\* \* \* \* \*

UNITED STATES PATENT AND TRADEMARK OFFICE
CERTIFICATE OF CORRECTION

PATENT NO. : 10,977,245 B2
APPLICATION NO. : 16/942421
DATED : April 13, 2021
INVENTOR(S) : Dageville et al.

Page 1 of 1

It is certified that error appears in the above-identified patent and that said Letters Patent is hereby corrected as shown below:

On the Title Page

In item (57), in "Abstract", in Column 2, Line 8, delete "puller" and insert --poller-- therefor In the Claims In Column 28, Line 26, in Claim 1, delete "puller" and insert --poller-- therefor Signed and Sealed this
Tenth Day of August, 2021

Drew Hirshfeld
*Performing the Functions and Duties of the
Under Secretary of Commerce for Intellectual Property and
Director of the United States Patent and Trademark Office*